United States Patent [19]

Boger

[11] 4,134,602
[45] Jan. 16, 1979

[54] TRAILER HITCH

[76] Inventor: Ernest F. Boger, 7502 5th Ave. South, Seattle, Wash. 98108

[21] Appl. No.: 870,354

[22] Filed: Jan. 18, 1978

[51] Int. Cl.² ............................................. B60D 1/06
[52] U.S. Cl. ............................................. 280/478 A
[58] Field of Search ................ 280/477, 478 R, 478 A

[56] References Cited

U.S. PATENT DOCUMENTS

| 2,988,383 | 6/1961 | Carson | 280/478 A |
| 3,243,202 | 3/1966 | Carson | 280/478 A |
| 3,740,078 | 6/1973 | Murr | 280/478 R |
| 3,820,822 | 6/1974 | Henderson | 280/478 A |

Primary Examiner—Joseph F. Peters, Jr.
Assistant Examiner—R. Schrecengost
Attorney, Agent, or Firm—Seed, Berry, Vernon & Baynham

[57] ABSTRACT

A trailer hitch having a bar with a hitch socket at its forward end is releasibly, pivotally and longitudinally mounted on the trailer frame such that it can be automatically latched in place merely by forward movement of the towing vehicle. A pivot is provided which includes a first member movable longitudinally of the trailer frame with a pivotal second member pivotally mounted on the first member. Spring biased pins automatically lock the slidable and pivoting members rigidly to the trailer frame when in latching positions and provided back-up safety protection against surge overloads.

9 Claims, 5 Drawing Figures

TRAILER HITCH

BACKGROUND OF THE INVENTION

1. Field of the Invention

This invention pertains to tow hitch apparatus for connecting a trailing vehicle or trailer onto a towing vehicle. More particularly, the invention relates to tow hitch apparatus which is easily connected to the towing vehicle.

2. Description of the Prior Art

Numerous types of tow hitch apparatus have been known heretofore. Many of these prior tow hitch apparatuses have been directed to overcoming the difficulty in aligning the ball of the towing vehicle with the socket of the towed vehicle. The problem is caused by impaired visibility when backing the towing vehicle and the heavy weight of the tow bar end of the trailing vehicle is generally too great to be manually lifted and moved into alignment with the ball of the towing vehicle. U.S. Pat. No. 3,740,078 illustrates a typical tow hitch apparatus in which the draw bar is extendible as well as rotatably mounted on the trailer frame. This tow hitch apparatus, however, is expensive to manufacture and requires time-consuming manually winching the tow bar into longitudinal alignment on the trailer frame imposing stresses on the wheel support of the trailer frame and winching difficulties for the operator. Other patents generally relating to this field are U.S. Pat. Nos. 3,820,822 and 2,988,383. Patent 2,988,383 in particular is of the desirable pull-forward to latch type of hitch but requires the inconvenient manual insertion of a safety pin for surge overload protection. Surge overload is the condition of an emergency vehicle stop where the full weight of the trailer pushes forward on the hitch.

SUMMARY OF THE INVENTION

It is an object of this invention to provide a fully automatic self-positioning tow hitch apparatus which latches into proper alignment merely by forward movement of the towing vehicle.

It is another object of this invention to provide an improved tow hitch apparatus which is easy to operate and safe to use.

Basically, these objects are obtained by providing a bar with a hitch socket at its forward end, a frame member rigidly secured to the trailing vehicle, pivot means pivotally mounting the bar on the frame member for pivotal movement as well as longitudinal movement, and self-latching means for releasibly locking the first and second means with said bar in its towing position relative to the frame member and longitudinally aligned with the frame member and with the self-latching means providing surge overload back-up protection.

The improved tow hitch apparatus enables an operator to back the towing vehicle into close proximity to the socket of the tow hitch apparatus and then swing the socket directly over the ball of the towing vehicle. After the trailer is lowered so that the socket supports the front end of the trailing vehicle on the ball of the towing vehicle, the operator need only drive the towing vehicle forward bringing the socket into its correct central alignment with the trailing vehicle and automatically locking, including back-up locking for surge overload, the towing bar in this towing position so that accidental lateral or longitudinal movements are thereafter prevented. In the preferred embodiment the pivotal connection is mounted on the member which is slidable longitudinally of the trailing vehicle and is much more easily constructed and simple to operate.

DETAILED DESCRIPTION OF THE PREFERRED EMBODIMENTS

Figure 1:
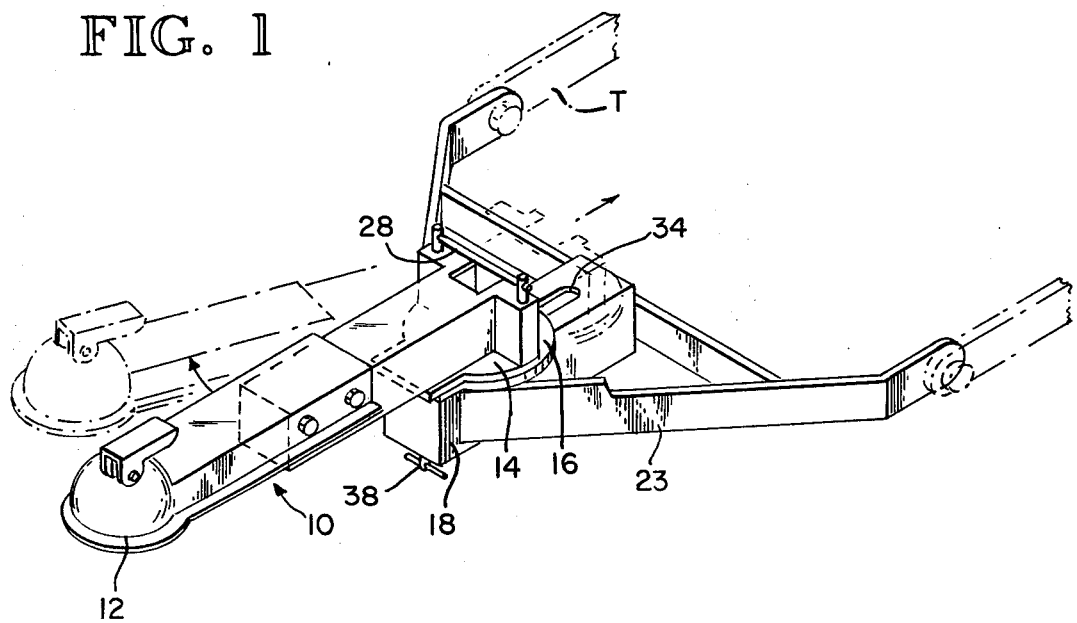
FIG. 1 is a fragmentary isometric of the improved tow hitch apparatus.
Figure 2:
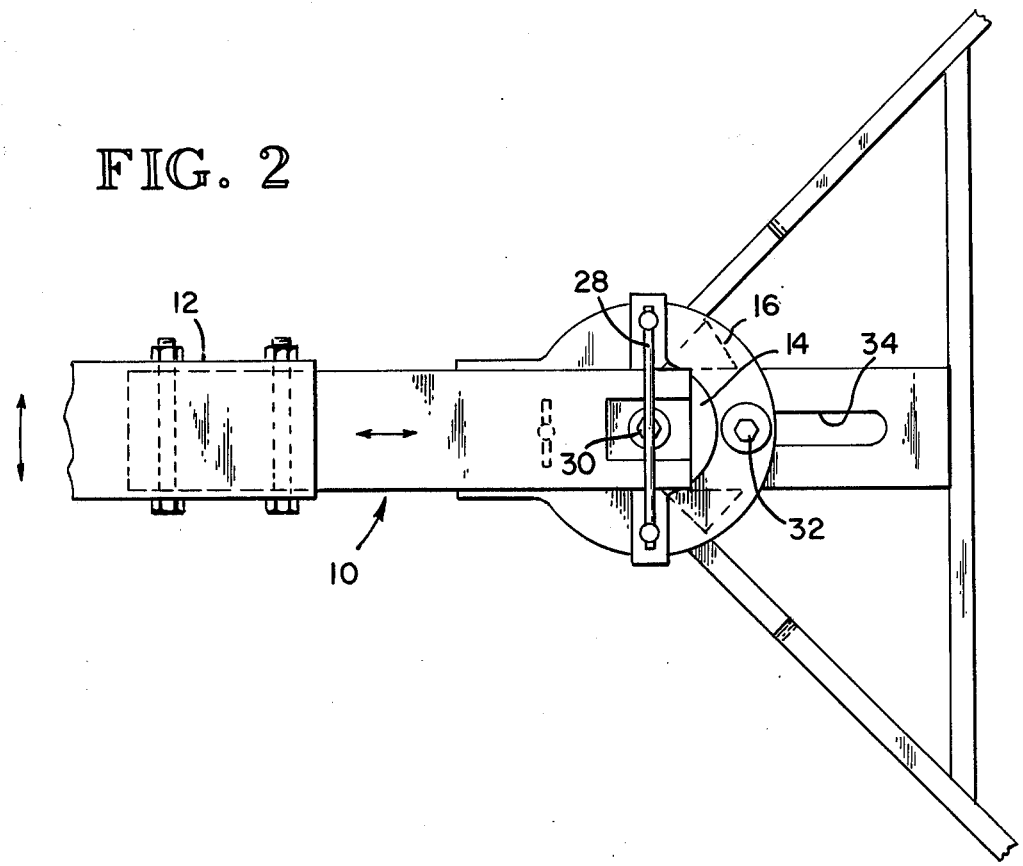
FIG. 2 is a plan of the tow hitch apparatus of FIG. 1.

As best shown in FIG. 1, the tow hitch apparatus includes a bar 10 having a conventional socket 12 bolted to its outer end. The bar is provided at its rear end with a plate 14 that is pivotally mounted on a plate 16. The plate 16 is slidably mounted for longitudinal fore and aft movement on a frame member 18 that is rigidly secured to the towed vehicle or trailer T. The hitch is adaptable to all types of towed vehicles including boat trailers, utility trailers, etc. As will be further described the socket can be swung laterally as shown by phantom lines in FIG. 1 or retracted longitudinally, also as shown in phantom lines in FIG. 1.

Figure 3:
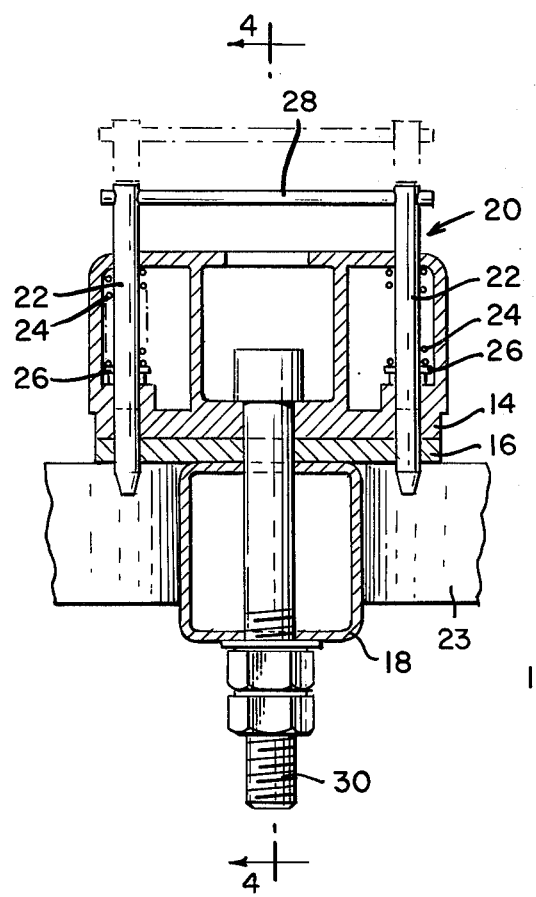
FIG. 3 is a vertical section of the two hitch apparatus taken along the line 3—3 of FIG. 4.

The bar 10 is provided with a self-latching mechanism 20 having a pair of pins 22 which in their lowermost position extend through the plate 14 and the plate 16 (FIG. 3). The pins also uniquely fall below and forward of the upper surfaces of bars or lateral appendages 23 when in the latched condition so that movement of the trailer frame member forward during a surge overload will be arrested by the pins 22 should a second pin 38 (to be described) fail. The pins are urged downwardly by springs 24 which engage washers 26 that are rigidly secured to the pins. A handle 28 is provided for retracting or raising the pins out of engagement with the holes in the plate 16. When retracted and with the bar 10 swung laterally a slight distance, the pins 22 may be released and will engage on the top surface of the plate 16 so that they will not return into their latched positions until the bar is again swung in longitudinal alignment with the center of the trailer T. When this alignment occurs, the springs will automatically reset the pins through the plate 16 thus locking the bar against further pivotal movement.

The plate 16 is held against the frame member 18 by a pair of bolts 30 and 32. Bolt 30 extends also through plate 14 serving as the pivot for plate 14. The bolts 30 and 32 pass through plate 16 and are positioned in an elongated slot 34 in the frame member 18. The nuts on the bolts are snug but allow sliding movement so that the bolts, the plate 16 and thus the bar 10 can be moved from a towing position extended as in FIG. 1 to a longitudinally retracted position in which it can be moved to place the socket over the ball on the towing vehicle. The bolts also absorb side loads on the hitch due to turning the vehicles around corners.

Figure 4:
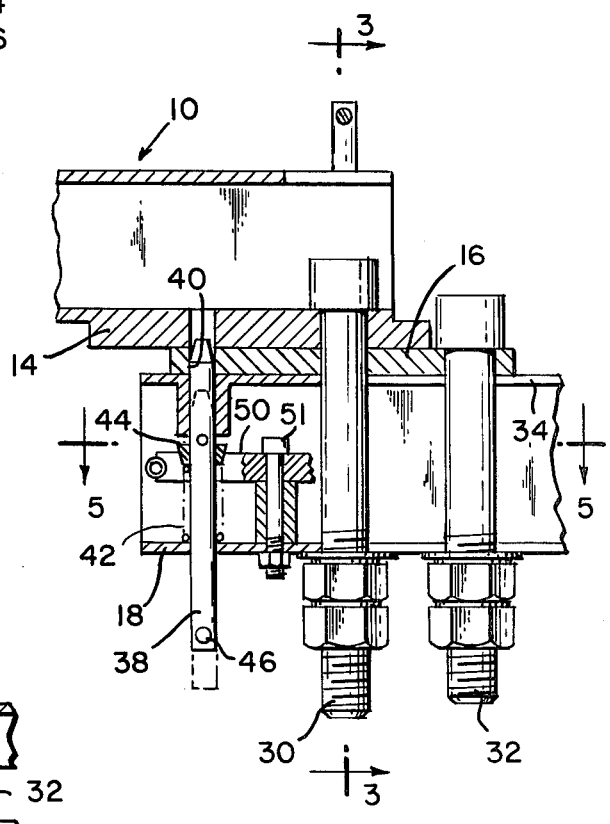
FIG. 4 is a fragmentary longitudinal section of the tow hitch apparatus.
Figure 5:
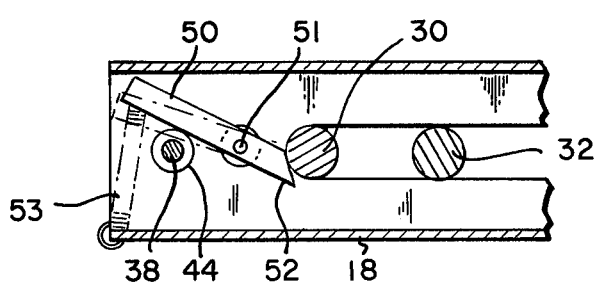
FIG. 5 is a fragmentary horizontal section taken along the line 5—5 of FIG. 4.

Longitudinal forward movement of the frame 18 is automatically arrested by a latching pin 38 that is insertable into a bore 40 in the plate 16. A spring 42 pushes against a disc 44 that is secured to the latching pin. The latching pin can be retracted or lowered into the phantom line position shown in FIG. 4 by a handle 46 and held in that position automatically by a blocking rod 50. The blocking rod is pivotally mounted to the frame member 18 by a bolt 51 and has one end 52 engageable with the bolt 30 as the bolts are pulled forwardly of the frame member 18 by the coupled towing vehicle to swing the blocking bar clockwise as shown in FIG. 5 out of the path of the disc 44. A spring 53 normally urges the opposite end of the blocking bar counterclockwise interferring with the path of movement of the disc 44. Thus to release the pin 38 the pin is pulled down by the handle to an extent such that the blocking bar will move into the phantom line position shown in FIG. 5 overlying the disc 44. When the handle 46 is released the spring 42 will push the disc 44 into engagement with the underside of the blocking bar thus preventing the pin 38 from reentering the bore 40 of the plate 16. However, as the plate 16 is pulled forward by movement of the socket 12 forwardly the bolt 30 will be moved into engagement with the end 52 thus swinging the blocking bar clear of the disc 44 and allowing the spring 42 to reinsert the latch pin into the bore 40 of the plate 16 preventing further longitudinal movement of the plate 16.

In operation the towing vehicle is backed so that its ball is generally in the vicinity of the socket 12. The handle 28 is then lifted releasing the bar 10 for lateral pivotal movement. Swinging of the bar laterally maintains the pins 22 along the top surface of the plate 16 so that the operator can then lower the pin 38. With the pin 38 lowered, the blocking bar holds the pin disengaged so that longitudinal movement of the blocking bar can also be obtained. When the socket is then seated over the ball and the trailer hitch lowered, the socket is secured. Next the operator can drive the towing vehicle forward. As the vehicle is moved forward, the pull on the bar 10 will tend to make the bar center itself along the central axis of the trailer such that the pins 22 will align themselves over the openings in the plates 16 and automatically become seated preventing any further pivotal movement of the bar 10. Simultaneously forward movement of the bar 10 through the pull of the towing vehicle will cause the blocking bar to be released allowing the pin 38 to seat itself in the bore 40 of the plate 16 preventing any further longitudinal movement. The trailer is now in position to be towed. As an additional safety factor the pins 22 will be positioned in close adjacency to the bars 23 to stop the trailer if pin 38 fails in a surge overload.

While the preferred embodiment of the invention has been illustrated and described, it should be understood that variations will be apparent to one skilled in the art without departing from the principles described herein. For example the movable members can be placed on the towing vehicle rather than the towed vehicle, if desired. Accordingly, the invention is not to be limited to the specific embodiment shown in the drawings.

I claim:
1. A tow hitch assembly adapted for longitudinal and pivotal adjustment, comprising:
  a bar having a hitch socket at a forward end,
  a frame member rigidly secured to a trailer,
  pivot means pivotally mounting the bar on the frame member for pivotal movement about a vertical axis, said pivot means including first means slidable longitudinally of said frame member and second means pivotally mounted relative to said first means, and self-latching means for releasibly automatically locking said first and second means with said bar in a towing position relative to said frame member and longitudinally aligned with said frame member.

2. The tow hitch assembly of claim 1, said first means including a plate and said frame member including a longitudinal slot, at least two vertical bolts passing through the plate and the slot to prevent rotational movement but allow longitudinal movement of the plate, said second means including a second plate carried on said first plate, one of said bolts extending through said second plate for allowing pivotal movement of the first plate on the second plate but precluding relative longitudinal movement between the two plates.

3. The tow hitch assembly of claim 2, said latching means including first pin means movable through both said first and second plates for preventing relative rotation between the plates in a locking position and movable out of engagement within said second plate into a release position for allowing relative rotation between the two plates, said frame member including a lateral appendage confronting said first pin means and rearward thereof when said first pin means extends through said second plate for engaging said first pin means in the event of surge overload.

4. The two hitch assembly of claim 3, said latching means including second pin means extendible through said second plate and said frame member for precluding longitudinal sliding of said second plate and movable into a retracted position out of engagement with said second plate for allowing movement.

5. The tow hitch assembly of claim 4, said latching means including a blocking rod pivotally mounted on said frame member and having one end engagable with said second pin means for holding the second pin means in a retracted position, said blocking rod having a second end engagable with one of said bolts for pushing the blocking bar out of the holding position with said second pin means, and spring means for urging the blocking bar toward said second pin means whereby movement of said second plate forwardly longitudinally of said frame member will cause said bolt to engage said blocking bar thereby automatically releasing said second pin means, and further including means for urging said second pin means toward said second plate.

6. The tow hitch assembly of claim 1, said latching means including first locking means for preventing rotational movement of said bar and second locking for preventing longitudinal movement of said bar, and including means for automatically engaging said second locking means.

7. The tow hitch assembly of claim 6, said means for automatically engaging said second locking means including a blocking rod pivotally mounted on said frame member engagable with a member fixed on said main frame when said bar is moved longitudinally forwardly of said frame member.

8. The tow hitch of claim 6, said latching means including means for automatically engaging said first locking means.

9. A tow hitch assembly for longitudinal and lateral adjustment comprising:
  a bar having a hitch socket at a forward end,
  means mounting the bar forward end on a trailing vehicle for movement longitudinally and laterally of the trailing vehicle for positioning the socket over the ball of a towing vehicle which is laterally and longitudinally offset from the towing position of the socket on the trailer, means for automatically latching the forward end of the bar in a towing position on the trailing vehicle in response to forward movement of the socket, said automatic latching means including first pin means for precluding pivotal movement of the trailing vehicle relative to the bar and second pin means for precluding longitudinal movement of the trailing vehicle relative to the bar, said first pin means automatically providing surge overload protection against longitudinal movement of the trailer relative to the bar in the event said second pin means should fail.

* * * * *